(12) United States Patent
Debras

(10) Patent No.: US 6,482,901 B1
(45) Date of Patent: Nov. 19, 2002

(54) TITANATED CHROMIUM/SILICA-ALUMINOPHOSPHATE CATALYST

(75) Inventor: Guy L Debras, Frasnes-les-Gosselies (BE)

(73) Assignee: Fina Research, S.A., Feluy (BE)

( * ) Notice: Subject to any disclaimer, the term of this patent is extended or adjusted under 35 U.S.C. 154(b) by 85 days.

(21) Appl. No.: 09/767,549

(22) Filed: Jan. 23, 2001

Related U.S. Application Data

(62) Division of application No. 09/326,062, filed on Jun. 4, 1999, now Pat. No. 6,225,253.

(30) Foreign Application Priority Data

Jun. 5, 1998  (EP) .............................................. 98110385

(51) Int. Cl.[7] ................ C08F 4/02; C08F 4/22
(52) U.S. Cl. ................ 526/113; 526/116; 526/154; 526/130; 526/348; 526/352; 502/113
(58) Field of Search .................. 526/113, 116, 526/154, 130, 348, 352; 502/113

(56) References Cited

U.S. PATENT DOCUMENTS

| | | | |
|---|---|---|---|
| 4,184,979 A | 1/1980 | Kirch et al. | 502/170 |
| 4,364,839 A | 12/1982 | McDaniel et al. | 502/155 |
| 4,376,722 A | 3/1983 | Chester et al. | 502/77 |
| 4,380,616 A | 4/1983 | Vance, Jr. et al. | 526/101 |
| 4,446,243 A | 5/1984 | Chester et al. | 502/62 |
| 4,704,478 A | 11/1987 | Olson | 568/388 |
| 4,741,782 A | 5/1988 | Lok et al. | 423/308 |
| 4,943,424 A | 7/1990 | Miller | 423/708 |
| 5,292,701 A | 3/1994 | Glemza et al. | 502/202 |
| 5,473,027 A | 12/1995 | Batchelor et al. | 526/106 |
| 5,942,104 A | 8/1999 | Miller | 208/28 |
| 6,300,272 B1 * | 10/2001 | Bodart | |

FOREIGN PATENT DOCUMENTS

| | | |
|---|---|---|
| EP | 0712868 | 5/1996 |
| EP | 0250860 | 1/1998 |
| WO | 9426790 | 11/1994 |

* cited by examiner

Primary Examiner—David W. Wu
Assistant Examiner—Caixia Lu
(74) Attorney, Agent, or Firm—Jim D. Wheelington

(57) ABSTRACT

The present invention relates to a chromium/silca-aluminophosphate catalyst, titanated under specific conditions and used for the homopolymerisation or the copolymerisation of ethylene. The polyethylene obtained with this catalyst has a high melt potential and a high shear resistance. The catalyst has a high level of activity.

4 Claims, No Drawings

TITANATED CHROMIUM/SILICA-ALUMINOPHOSPHATE CATALYST

This is a divisional application of application Ser. No. 09/326,062, filed Jun. 4, 1999 now U.S. Pat. No. 6,225,253.

The present invention relates to a highly active catalyst for producing polyethylene having good processability and good mechanical properties. The present invention further relates to a process for producing said catalyst and to the use of such a catalyst.

For polyethylene, and for high density polyethylene (HDPE) in particular, the molecular weight distribution (MWD) is a fundamental property which determines the properties of the polymer, and thus its applications. It is generally desirable for the polyethylene resin to have good processing properties whereby the polyethylene may readily be processed to form the appropriate article. In order to achieve such good processability of the polyethylene resins, it is desired that the flow properties of the polyethylene resins are improved; it is in particular desirable that the polyethylene resin has a high melt index, which is an indication of low molecular weight polyethylene polymers in the polyethylene resin. Good physical properties can be obtained with polyethylene having a high molecular weight. These high molecular weight molecules, however, render the polymer more difficult to process. The broadening of the molecular weight distribution permits an improvement in the processing of polyethylene at high molecular weight while keeping its good physical properties.

The molecular weight distribution can be completely defined by means of a curve obtained by gel permeation chromatography. Generally, the molecular weight distribution (MWD) is more simply defined by a parameter, known as the dispersion index D, which is the ratio between the average molecular weight by weight (Mw) and the average molecular weight by number (Mn). The dispersion index constitutes a measure of the width of the molecular weight distribution. For most applications, the molecular dispersion index varies between 10 and 30.

A variety of catalyst systems are known for the manufacture of polyethylene. It is known in the art that the physical properties, in particular the mechanical properties, of a polyethylene resin can vary depending on what catalyst system was employed to make the polyethylene. This is because different catalyst systems tend to yield different molecular weight distributions in the polyethylene produced. It is known to employ a chromium-based catalyst i.e. a catalyst known in the art as a "Phillips catalyst". Such a chromium-based catalyst enables the production of polyethylene having desirable physical and rheological properties. There is a continuous incentive to develop new chromium-based Phillips catalysts for the production of polyethylene resins having improved mechanical or processing properties.

Such supported chromium-oxide Phillips catalysts which have been developed for the production of linear high density polyethylene resins incorporate a support which is usually a silica, with a large surface area, typically greater than 200 $m^2/g$, and a large pore volume, typically greater than 0.8 ml/g. The support may be modified so as to include cogels such as silica-titania or silica-alumina and by the replacement of silica by alumina or amorphous aluminium phosphates. Furthermore, the support may comprise a tergel which is produced by mixing a chromium source with the silica and titania compound.

EP-A-0712868 discloses a catalytic system for the polymerisation of olefins comprising a catalytic solid based on chrome deposited on a support comprising silica, alumina and aluminium phosphate, together with an organoaluminium co-catalyst. Titanium dioxide may be present in the support. The support may be prepared by a co-precipitation technique.

U.S. Pat. No. 4727124 and EP 0250860 disclose the preparing of a supported catalyst which is laden with chromium, phosphorous and titanium and has a silicate carrier. The silicate carrier is mixed successively with suspensions incorporating chromium trioxide, a phosphate or phosphite and a titanate prior to the suspension being evaporated to dryness.

Amorphous aluminium phosphates with both high surface area and high pore volume have been found in the art to be difficult to produce. Consequently, it has been known to use a process known as "poregelisation" for introducing a metal phosphate, in particular an aluminium phosphate, into the silica support. EP-A-0,055,864 discloses such a process for introducing metal phosphates into the silica support of a chromium-based catalyst for olefin polymerisation. In contrast to standard chromium-based catalysts having a silica support which has been impregnated with chromium oxide, the metal phosphate supported chromium-based catalysts are characterised by an outstanding sensitivity to hydrogen. The introduction of hydrogen into the polymerisation medium induces a drastic increase in the melt flow index of the resultant polyethylene resins. In addition, the introduction of triethyl boron (TEB) cocatalyst can result in an increase of the melt flow index of the polyethylene resins, whereas with standard chromium-based catalysts incorporating a silica support, the TEB induces a decrease in the melt flow index. In addition, the metal phosphate supported chromium-based catalysts can produce resins with a broad molecular weight distribution and good mechanical properties, particularly improved environmental stress cracking resistance (ESCR).

The metal phosphate supported chromium-based catalysts disclosed in EP-A-0,055,864 suffer from the disadvantage that the melt index potential of the catalyst is quite low without the use of hydrogen and/or TEB in a polymerisation medium. Moreover, those catalysts suffer from the technical problem that they have relatively low activity for the polymerisation process for the manufacture of polyethylene.

The technique of "poregelisation" disclosed in EP-A-0,055,864 includes the coating of a silica carrier with an amorphous aluminium phosphate by the impregnation of an aluminium phosphate gel inside the pores of the support. Chromium can be added during this step or afterwards, for example by standard impregnation techniques. A particular method disclosed in EP-A-0,055,864 for impregnating a silica hydrogel or xerogel with aluminium orthophosphate involves combining a source of aluminium ions and phosphate ions with a slurry of a silica hydrogel or xerogel and then evaporating the solvent by conventional techniques whereby aluminium phosphate forms in the process by neutralisation with a neutralising agent, such as ammonium hydroxide. The resultant impregnated silica is then dried and activated at elevated temperature.

A commercial poregel catalyst developed according to the process disclosed in EP-A-0,055,864 is available in commerce from the company Grace Davison. The catalyst is characterised by a surface area of 234 $cm^2/g$ and a pore volume of 1.15 ml/g; it has a poor catalyst activity and a low melt index potential. There is a need to improve this commercially available catalyst.

EP-A-0,055,864 discloses three other methods for producing a metal phosphate supported chromium-based catalyst system for olefin polymerisation.

One method involves the production of a cogel of silica/alumina/phosphorous oxide by coprecipitation of silicate ions, aluminium ions and phosphate ions, with subsequent neutralisation to form the cogel. The neutralisation may be achieved by concentrated ammonium hydroxyde.

The second method forms an aluminium phosphate matrix, with silica as a dispersed phase therein. In this method, a silica hydrogel or xerogel is combined with aluminium orthophosphate which is then precipitated.

The third method involves mixing of a silica xerogel with an aluminium orthophosphate xerogel to form a gel mixture.

WO-A-94/26798 also discloses a cogelation process in which a catalyst support containing at least two components chosen among silica, alumina and aluminium phosphate is formed as a gel which is then washed and dried to form a powder which is then calcined. Titanium may be present in the support.

These known catalysts are often used with a triethylboron (TEB) cocatalyst. They are quite sensitive to the introduction of hydrogen in the polymerisation medium. Introduction of TEB or hydrogen or the use of high activation temperature are often required in order to achieve the desired high level of activity and high melt flow potential. The elevated activation temperature, however will be detrimental to the mechanical properties of the resins in general and of the environmental stress cracking resistance (ESCR) in particular.

It is known in the art to provide titanium in a chromium-based catalyst. Titanium can be incorporated either into the support for the chromium catalyst or into the catalytic composition deposited on the support. Titanium can be incorporated into the support by coprecipitation or terprecipitation as is the case for cogel or tergel type catalysts developed by Phillips Petroleum. Cogel and tergel catalysts respectively are binary and ternary supports. Alternatively, titanium can be incorporated into the support by impregnation of the support as described for example in U.S. Pat. No. 4,402,864 or by chemisorption of a titanium compound into the support as described for example in U.S. Pat. No. 4,016,343.

Titanation of the catalytic composition has been disclosed in earlier patent specifications U.S. Pat. No. 4,728,703 discloses that titanium can be incorporated into the catalytic composition by adding to a composite liquid suspension, of a carrier material (i.e. a support) and chromium trioxide, a titanium compound of the formula $Ti(OR)_4$. U.S. Pat. No. 4,184,979 discloses that titanium can be incorporated into the catalytic composition by adding at elevated temperature a titanium compound such as titanium tetraisopropoxide to a chromium-based catalyst which has been heated in a dry inert gas. The titanated catalyst is then activated at elevated temperature.

The ethylene polymers obtained with the above mentionned processes do not exhibit the desired good processing and mechanical properties together with a high catalyst activity.

Therefore, there exists a need for a chromium-based catalyst capable of producing polyethylene resins for blow molding, having good processability, good physical properties and a high activity.

It is an aim of the present invention to provide a catalyst for the polymerisation of ethylene to produce polyethylene having a high melt flow potential.

It is another aim of the present invention to provide a catalyst for polymerising ethylene to produce polyethylene having good processability.

It is a further aim of the present invention to provide a catalyst for polymerising ethylene to produce polyethylene having improved mechanical properties.

It is yet a further aim of the present invention to provide a catalyst for producing polyethylene having the above-described properties, said catalyst having a high activity.

These and other aims can be achieved with a titanated chromium/silica -alumino-phosphate catalyst prepared under specific conditions, said catalyst being used for the production of high density polyethylene with improved melt flow potential and mechanical properties and said catalyst having an improved catalytic activity.

The present invention provides a process for preparing a supported chromium/silica-aluminophosphate catalyst for the production of high density polyethylene, by polymerising ethylene, or copolymerising ethylene and an alpha-olefinic comonomer comprising 3 to 10 carbon atoms, which comprises the steps of;

a) impregnating a silica support with aluminium phosphate;

b) either simultaneously with or after step a) coating the support with chromium to form a chromium/silica-aluminophosphate catalyst;

c) dehydrating the chromium/silica-aluminophosphate catalyst to remove physically adsorbed water by heating the catalyst in an atmosphere of dry, inert gas;

d) titanating the chromium/silica-aluminophosphate catalyst, to form a titanated chromium/silica-aluminophosphate catalyst having a titanium content of from 1 to 5% by weight Ti, based on the weight of the titanated catalyst; and e) activating the titanated catalyst at a temperature of from 500 to 900° C.

The present invention further provides a chromium/silica-aluminophosphate catalyst for the production of high density polyethylene, by polymerising ethylene, or copolymerising ethylene and an alpha-olefinic comonomer comprising 3 to 10 carbon atoms, the catalyst comprising a silica-aluminophosphate support, a chromium compound deposited on the support, and a titanium compound deposited on the support and comprising from 1 to 5% by weight Ti, based on the weight of the titanated catalyst.

The present invention further provides the use of the catalyst of the invention in the production of high density polyethylene for providing a high melt flow index and/or a high shear response thereby to exhibit improved mechanical properties.

The present inventors have observed that the titanation of a chromium/silica-aluminophosphate catalyst is an alternative solution to using triethylboron and hydrogen to improve the catalytic activity and the melt flow index of this class of catalysts. In addition, the mechanical properties of the resulting polyethylene are at least maintained, and often improved by titanation of the above described catalyst.

The silica-containing support material used in the catalyst of this invention can be any catalytic support known in the art. The surface area is typically larger than 200 $m^2/g$ and the pore volume greater than 0.8 ml/g. Preferably the surface area is larger than 300 $m^2/g$ and the pore volume greater than 1.2 ml/g.

Preferably, the chromium compound is impregnated into the silica support by an impregnation solution which also includes a source of aluminium ions and a source of phosphate ions. A typical impregnation solution is prepared by dissolving aluminium nitrate nonahydrate $Al(NO_3)_3.9H_2O$, ammonium dihydrogen phosphate $(NH_4)H_2PO_4$ and chromium nitrate nonahydrate $(Cr(NO_3)_3.9H_2O)$ in deionised water.

The amounts of the aluminium and phosphorous compounds in the impregnation solution are preferably calculated so as to provide in the impregnation solution a phosphorous/aluminium atomic ratio ranging from 0.4 to 0.95, preferably from 0.5 to 0.85, and a final aluminium phosphate content in the catalyst of from 10 to 30% by weight, preferably 15 to 25% by weight, based on the weight of the final chromium-based catalyst. Preferably, the catalyst has a chromium content of from 0.5 to 1.5% by weight, more preferably from 0.75 to 1.1% by weight, based on the weight of the chromium-based catalyst. When preparing the impregnation solution, in order that free impregnation solution is provided after the impregnation step, the amount of water employed to make up the impregnation solution is preferably at least 2 times the pore volume of the silica employed, more preferably from 2 to 5 times the pore volume of the silica employed, most typically around 3 times the pore volume of the silica support.

The neutralisation agent typically comprises concentrated ammonia hydroxide solution, for example such a solution comprising 25% by weight ammonia.

The silica support is preferably dried prior to the impregnation step, preferably by heating the silica support to a temperature of at least 100° C. in an oven. Thereafter the dried silica support is added to the impregnation solution. The mixture is preferably maintained under smooth stirring for a few minutes in order to ensure complete impregnation of the aluminium phosphate into the pores of the silica support.

Then, under continued stirring, the neutralising agent, preferably comprising a concentrated solution of ammonium hydroxide, is progressively added, preferably drop by drop. The percentage neutralisation, calculated as $$\% \text{ neutralisation} = \frac{(\text{No moles NH}_4\text{OH added}) \times 100}{(\text{No moles Al(NO}_3)_3 \times 3) - (\text{No moles NH}_4\text{H}_2\text{PO}_4)}$$

preferably varies from greater than 100% to up to 300%.

After addition of the neutralising agent, the mixture is allowed to age typically for a period of 5 hours to greater than 5 days and at a typical temperature of room temperature (25° C.).

Thereafter, the silica support impregnated with the aluminium phosphate gel is washed with deionised water until the pH is stable. The support is subsequently washed with a low surface tension, water-miscible organic liquid, typically an alcohol such as isopropanol. The washing can be performed while filtering the impregnated support.

After the washing step, the gel impregnated silica support is dried, typically in a ventilated oven at around 80° C., and then comminuted, for example by crushing, and sieved to achieve the correct particle size distribution.

The supported chromium/silica-aluminophosphate catalyst is then dehydrated, preferably by heating in a stream of fluidised dry inert and non-oxidising gas, such as nitrogen at a temperature of at least 300° C., for 0.5 to 2 hours in order to remove all physically adsorbed water. The removal of physically adsorbed water avoids the formation of $TiO_2$ as a product from the reaction of water with the titanium compound subsequently introduced during the titanation procedure, as described below.

In a next step, the supported chromium/silica-aluminophosphate catalyst is loaded with a titanium compound. The titanium compound may be of the formula $R_n\text{Ti(OR')}_m$ and $(\text{RO})_n\text{Ti(OR')}_m$ wherein R and R' are the same or different and can be any hydrocarbyl group containing from 1 to 12 carbon atoms, n is 0 to 3, m is 1 to 4 and m+n equals 4. Preferably, the titanium compound is a titanium tetraalkoxide $\text{Ti(OR')}_4$ where R' can be an alkyl or a cycloalkyl group each having from 3 to 5 carbon atoms. The titanation is performed by progressively introducing the titanium compound into the stream of dry, inert non-oxidising gas described hereabove in the dehydration step. In the titanation step, the temperature is, as for the dehydration step, maintained at least at 300° C. Preferably, the titanium compound is pumped as a liquid into the reaction zone where it vaporises. The titanation step is controlled so that the titanium content of the resultant catalyst is from 1 to 5% by weight, and preferably from 2 to 4% by weight, based on the weight of the titanated chromium/silica-aluminophosphate catalyst. The total amount of titanium compound introduced into the gas stream is calculated in order to obtain the required titanium content in the resultant catalyst and the progressive flow rate of the titanium is adjusted in order to provide a titanation reaction period of 0.5 to 1 hour.

After the introduction of the titanium compound has been terminated at the end of the reaction period, the catalyst is flushed under the gas stream for a period of typically 0.75 hours.

The dehydration and titanation steps are performed in the vapour phase in a fluidised bed.

The titanated catalyst is then subjected to an activation step in dry air at an elevated activation temperature for at least 6 hours. The activation temperature preferably ranges from 500 to 900° C., and is most particularly around 650° C. The atmosphere is progressively changed from nitrogen to air, and the temperature is progressively increased, from the titanation step to the activation step.

The resultant titanated chromium/silica-aluminophosphate catalyst has a very high activity.

In the preferred polymerisation process of the present invention, the polymerisation or copolymerisation process is carried out in the liquid phase, the liquid comprising ethylene, and where required an alpha-olefinic comonomer comprising from 3 to 10 carbon atoms, in an inert diluent. The comonomer may be selected from 1-butene, 1-hexene, 4-methyl 1-pentene, 1-heptene, 1-octene. The inert diluent is preferably isobutane. The polymerisation process is typically carried at a temperature of from 85 to 110° C., preferably from 95 to 106° C. and at a pressure of from 20 to 45 bars, preferably from 40 to 42 bars.

Typically, in the polymerisation process the ethylene monomer comprises from 0.5 to 8% by weight, typically around 5% by weight, of the total weight of the liquid phase. Typically, in the copolymerisation process the ethylene monomer comprises from 0.5 to 8% by weight and the comonomer from 0 to 2% by weight, each based on the total weight of the liquid phase.

The titanated chromium/silica-aluminophosphate catalyst is introduced into the polymerisation reactor. The alkylene monomer, and comonomer if present, are fed into the polymerisation reactor. In the preferred process of the present invention, the polymerisation or copolymerisation process is carried out in a liquid-full loop reactor; after a residence time in the reactor of 0.5 to 2 hours, and preferably of about one hour, the polyethylene is recovered and transferred to one or more settling legs. The polymerisation product of high density polyethylene is discharged from the settling legs and separated from the diluent which can then be recycled.

The polyethylene obtained with the catalyst of this invention has a broad molecular weight distribution (MWD) which is represented by the dispersion index D of typically from 11 to 16, a high density, typically from 0.950 to 0.960 g/cm$^3$ and a melt flow index M12 larger than 0.2 g/1 0 min.

In addition, at same melt flow index, it exhibits a higher shear resistance SR.

It is surprisingly observed that the polyethylene obtained with the catalyst of this invention has much higher melt flow potential than those obtained using the processes and catalysts of the prior art. The polyethylene obtained in accordance with the invention also has a highly improved shear resistance (SR), defined as the ratio HLMI/MI2 where HLMI is the high load melt index measured at 190° C. and under a load of 21.6 kg and M12 is the melt index measured at 190° C. under a load of 2.16 kg, both with the ASTM D-1238 standard method. The environmental stress cracking resistance, referred to herein as the Bell ESCR F50 values determined in accordance with ASTM D-1693-70, Procedure B, are mostly unchanged.

Whilst the operating conditions, such as the temperature and pressure of polymerisation in the reactor, and the catalyst's preparation conditions, such as the surface area of the support or its contents, obviously have an influence on the properties of the resulting polymer, titanation of the catalyst under the specific conditions described above improves the melt flow potential and the shear resistance, all other factors being equal.

The following Examples are given to illustrate the invention without limiting its scope.

EXAMPLES 1 AND 2

A chromium/silica-aluminophosphate catalyst with a target composition of 20% by weight of $AlPO_4$ and 80% by weight of $SiO_2$ with a chromium content of 2.09% by weight and with a phosphorous to aluminium molar ratio P/Al of 0.6 was prepared by the following steps.

100 ml of impregnation solution was prepared by dissolving 20.3 g of aluminium nitrate nonahydrate, 3.82 g of ammonium dihydrogenophosphate and 1.94 g of chromium nitrate in deionized water. The solution was placed in a 250 ml glass reactor. 20 g of a silica carrier (Grace G5HNQ grade) were dried at 100° C. for 12 hours in an oven, cooled down in a desiccator and added to the solution. The mixture was smoothly stirred for 20 minutes. Then still under stirring, 21.6 ml of concentrated $NH_4OH$ solution (25% ammonia) were added drop by drop in the reactor. Stirring was maintained for for 10 to 15 minutes after the addition of ammonia was completed and then the gel was allowed to age for one night at room temperature. After ageing, the gel was washed with deionized water and then with isopropanol and filtered on a buckner funnel. After the washing step, the gel was dried at a temperature of around 80° C. in an oven. Thereafter the dried catalyst was smoothly crushed in a mortar and sieved to remove the largest particles. The surface area of this catalyst was 378 $m^2/g$ and the pore volume was 1.57 ml/g.

This chromium/silica-aluminophosphate catalyst was then introduced in an 10 activator vessel incorporating a fluidised bed, flushed under nitrogen and the temperature was raised from room temperature to 300° C. The dehydration step was then carried out at this elevated temperature for 2 hours. After the dehydration step, titanium triisopropoxide, stored under anhydrous nitrogen, was progressively injected in the bottom of the activator vessel incorporating the fluidised bed. The amount of titanium triisopropoxide injected was calculated in order to give the required titanium content, in the examples about 4% by weight, in the resultant catalyst and the flow thereof adjusted in order to continue the injection to complete the desired level of titanation in around 30 minutes. After the injection was completed, the catalyst was flushed under nitrogen for around 45 minutes. Nitrogen was then progressively switched to air and the temperature was raised to the activation temperature of around 650° C. for the subsequent activation step. In the activation step, the titanated chromium/silica-aluminophosphate catalyst was maintained at the activation temperature for 6 hours. At the end of the activation step, the temperature was progressively decreased to 350° C. At continued cooling from 350° C. to room temperature, the catalyst was flushed under nitrogen.

The polymerization of ethylene was carried out in one liquid-full loop reactor; the diluent was isobutane. For Example 1, the ethylene pressure was adjusted in order to obtain 6% by weight ethylene in isobutane. For Example 2, 1-hexene was added as a comonomer (0.5% by weight 1-hexene in isobutane). The amount of catalyst injected was adjusted in order to reach a productivity of about 1000 g PE/g catalyst. The polymerisation temperatures and the results are presented in Table I.

COMPARATIVE EXAMPLES 1 AND 2

The preparation of the chromium/silica-aluminophosphate catalyst was identical to that of Examples 1 and 2 but the titanation step was absent. Instead, the chromium/silica-aluminophosphate catalyst was activated at 650° C. for 6 hours. The homo- and copolymerisation were then carried out exactly as for Examples 1 and 2 respectively.

The results are presented in Table I.

TABLE I

|  | Example 1 | Example 2 | Comparative Example 1 | Comparative Example 2 |
|---|---|---|---|---|
| Treatment | With titanation | | Without titanation | |
| Polymer type | homopolymer | copolymer | homopolymer | copolymer |
| Polym. Temp (° C.) | 104 | 98 | 104 | 102 |
| MI2 (g/10 min) | 0.344 | 0.291 | 0.117 | 0.202 |
| HLMI (g/10 min) | 31.2 | 33.5 | 11.6 | 20.7 |
| SR | 91 | 115 | 93 | 103 |
| Activity (g/g/h) | 796 | 628 | 707 | 540 |

These results of examples 1 and 2 and of comparative examples 1 and 2 show that titanation of the catalyst according to the invention drastically increases the melt flow index MI2 of the polyethylene resin. They also show that, for a given melt flow index MI2, the shear response SR is increased, resulting in better mechanical properties and processing of the polymer. The activity of the catalyst is also increased by 10 to 20% (see for example Example 1 and comparative Example 1 which are both performed at 104° C.).

EXAMPLES 3 TO 20

A commercial chromium/silica-aluminophosphate catalyst obtained from Grace was used in these Examples. It was characterised by a surface area of 234 m²/g and a pore volume of 1.15 ml/g. It was dehydrated and titanated following the same procedure as Examples 1 and 2, the titanium content being varied from 2 to 4.5% by weight. It was then activated at 650° C. as in the previous Examples. The copolymerisation of ethylene using 1-hexene as comonomer (in the same amount as in Example 2) was carried in a liquid-full loop reactor and the operating conditions are specified in Table II.

In some instances, a cocatalyst, triethylaluminium (TEAL), was employed in the amounts specified in Table II.

COMPARATIVE EXAMPLES 3 TO 8

The same commercial chromium/silica-aluminophosphate catalyst as that of Examples 3 to 20 was used. It was not titanated and was activated at a temperature of 650° C. as in all other Examples.

The copolymerisation as in Examples 3 to 20 was similarly carried out in a liquid-full loop reactor under the operating conditions specified in Table III.

TABLE III

| COMPARATIVE EXAMPLE | 3 | 4 | 5 | 6 | 7 | 8 |
|---|---|---|---|---|---|---|
| LOOP OP. COND. | | | | | | |
| Temperature ° C. | 106 | 106 | 106 | 106 | 106 | 104 |
| TEAL ppm | 0.25 | 0.25 | 0.25 | 0.25 | 0.25 | 0.25 |
| FLUFF | | | | | | |
| HLMI g/10 min | 23.7 | 27.4 | 19.6 | 20.3 | 28.2 | 31 |
| MI2 g/10 min | 0.21 | 0.25 | 0.165 | 0.15 | 0.27 | 0.27 |
| SR | 113 | 109 | 119 | 135 | 104 | 115 |
| Density g/cm³ | 0.955 | 0.955 | 0.955 | 0.955 | 0.955 | 0.949 |
| PELLETS | | | | | | |
| HLMI g/10 min | 18.9 | 21.2 | 16.9 | 17.7 | 22 | 22.4 |

TABLE II

| EXAMPLE | 3 | 4 | 5 | 6 | 7 | 8 | 9 | 10 | 11 | 12 | 13 |
|---|---|---|---|---|---|---|---|---|---|---|---|
| Titanium % by weight | 2 | 2 | 2 | 2 | 2 | 2 | 2 | 4 | 4 | 4 | 4 |
| LOOP OP. COND. | | | | | | | | | | | |
| Temperature ° C. | 106 | 105 | 105 | 104 | 104 | 105.5 | 106 | 106 | 105 | 104 | 104 |
| TEAL ppm | 0 | 0 | 0 | 0 | 0 | 0.25 | 0 | 0.25 | 0.25 | 0.25 | 0.25 |
| FLUFF | | | | | | | | | | | |
| HLMI g/10 min | 33.9 | 34.8 | 34.7 | 41.4 | 34.7 | 35.3 | 39.2 | 38.7 | 38.9 | 31.4 | 39.9 |
| MI2 g/10 min | 0.32 | 0.33 | 0.31 | 0.38 | 0.32 | 0.32 | 0.35 | 0.35 | 0.34 | 0.22 | 0.33 |
| SR | 106 | 105 | 112 | 108 | 108 | 110 | 112 | 111 | 114 | 143 | 121 |
| Density g/cm³ | 0.955 | 0.954 | 0.952 | 0.951 | 0.951 | 0.959 | 0.958 | 0.956 | 0.953 | 0.950 | 0.950 |
| PELLETS | | | | | | | | | | | |
| HLMI g/10 min | 25.9 | 25.4 | 29.3 | 28 | 28.4 | 30.1 | 29.8 | 28.9 | 28.9 | 27.1 | 30.7 |
| MI2 g/10 min | 0.23 | 0.2 | 0.27 | 0.225 | 0.25 | 0.25 | 0.255 | 0.23 | 0.22 | 0.204 | 0.24 |
| SR | 113 | 127 | 110 | 124 | 114 | 120 | 117 | 126 | 131 | 133 | 128 |
| Density g/cm³ | 0.959 | 0.957 | 0.956 | 0.954 | 0.954 | 0.962 | 0.963 | 0.960 | 0.957 | 0.955 | 0.955 |
| MWD | 11.8 | 11.1 | 11.8 | 11.4 | 11.5 | 12.3 | 14.7 | 12.5 | 12 | 11.4 | 11 |
| Bell ESCR 50° C. h | 35 | 40 | 40 | 69 | 68 | 19 | 21 | 21 | 35 | 46 | 47 |
| PRODUCTIVITY | | | | | | | | | | | |
| g PE/g cat | 1120 | 1090 | 840 | 840 | 730 | 660 | 620 | 910 | 980 | 900 | 900 |

| EXAMPLE | 14 | 15 | 16 | 17 | 18 | 19 | 20 |
|---|---|---|---|---|---|---|---|
| Titanium % by weight | 4 | 4 | 4 | 4 | 4.5 | 4.5 | 4.5 |
| LOOP OP. COND. | | | | | | | |
| Temperature ° C. | 104 | 104 | 103 | 106 | 106 | 106 | 106 |
| TEAL ppm | 0 | 0 | 0 | 10.25 | 0.25 | 0.25 | 0.5 |
| FLUFF | | | | | | | |
| HLMI g/10 min | 44.7 | 39.9 | 37.7 | 34.5 | 27.5 | 26.1 | 16.1 |
| MI2 g/10 min | 0.42 | 0.36 | 0.31 | 0.31 | 0.24 | 0.24 | 0.12 |
| SR | 106 | 111 | 122 | 111 | 114 | 107 | 130 |
| Density g/cm³ | 0.951 | 0.951 | 0.950 | 0.955 | 0.955 | 0.956 | 0.954 |
| PELLETS | | | | | | | |
| HLMI g/10 min | 37.7 | 32.7 | 30.2 | 30.4 | 25.8 | 24.1 | 21.3 |
| MI2 g/10 min | 0.32 | 0.25 | 0.23 | 0.25 | 0.19 | 0.15 | 0.145 |
| SR | 118 | 131 | 131 | 122 | 136 | 160 | 149 |
| Density g/cm³ | 0.955 | 0.955 | 0.954 | 0.959 | 0.959 | 0.959 | 0.959 |
| MWD | — | — | — | 12.6 | 14.2 | 15.1 | 14.7 |
| Bell ESCR 50° C. h | 41 | 51 | 61 | 21 | — | 25 | 25 |
| PRODUCTIVITY | | | | | | | |
| g PE/g cat | — | 860 | 880 | 715 | 760 | 690 | 590 |

TABLE III-continued

| COMPARATIVE EXAMPLE | 3 | 4 | 5 | 6 | 7 | 8 |
|---|---|---|---|---|---|---|
| MI2 g/10 min | 0.15 | 0.16 | 0.13 | 0.135 | 0.187 | 0.173 |
| SR | 126 | 133 | 130 | 131 | 118 | 129 |
| Density g/cm$^3$ | 0.957 | 0.957 | 0.958 | 0.958 | 0.958 | 0.953 |
| MWD | 11.7 | | 12.4 | 13.3 | 12.3 | 12.9 |
| Bell ESCR 50° C. h | 39 | 47 | 50 | 45 | 40 | 40 |
| PRODUCTIVITY g PE/g cat | 510 | 460 | — | 570 | 530 | 650 |

Comparison of Tables II and III shows that titanation of the chromium/silica-aluminophosphate catalyst results in a large increase of the melt flow index MI2, eliminating the need for hydrogen in order to reach the required value of at least 0.2 g/10 min for MI2.

FIG. 1 shows the relationship between the shear response SR and the high load melt index HLMI for examples 3 to 20 and comparative examples 3 to 8.

The shear response SR of the resin at a given high load melt index HLMI is also increased by using titanation in accordance with the invention as can be seen in FIG. 1 which represents the shear response, along the y-axis, as a function of HLMI expressed in 9/10 min, along the x-axis.

The environmental stress cracking resistance ESCR is little affected by the treatment.

The catalyst activity is also drastically increased by using titanation of the catalyst in accordance with the invention, resulting in a productivity increase of 30 to 100%.

What is claimed is:

1. A process for preparing polyethylene in the presence of a chromium/silica-aluminophosphate catalyst for the production of high density polyethylene, by polymerising ethylene, or copolymerising ethylene and an alpha-olefinic comonomer comprising 3 to 10 carbon atoms, the catalyst comprising a silica aluminophosphate support, a chromium compound deposited on the support, and a titanium compound deposited on the support and comprising from 1 to 5% by weight Ti, based on the weight of the titanated catalyst.

2. A catalyst according to claim 1 wherein the support has a specific surface area of at least 200 m$^2$/g.

3. A catalyst according to claim 1 wherein the catalyst contains from 10 to 30 wt % aluminium phosphate, based on the weight of the catalyst.

4. A catalyst according to claim 2 wherein the catalyst contains from 10 to 30 wt % aluminium phosphate, based on the weight of the catalyst.

* * * * *

UNITED STATES PATENT AND TRADEMARK OFFICE
CERTIFICATE OF CORRECTION

PATENT NO. : 6,482,901 B1
DATED : November 19, 2002
INVENTOR(S) : Guy L. Debras

It is certified that error appears in the above-identified patent and that said Letters Patent is hereby corrected as shown below:

<u>Title page,</u>
Item [30], should read:

-- [30]   Foreign Application Priority Data

June 5, 1998   (E) ................................ 98110358.3. --

Signed and Sealed this

Third Day of June, 2003

JAMES E. ROGAN
*Director of the United States Patent and Trademark Office*